United States Patent
Dey et al.

(10) Patent No.: US 10,657,498 B2
(45) Date of Patent: May 19, 2020

(54) AUTOMATED RESUME SCREENING

(71) Applicant: Walmart Apollo, LLC, Bentonville, AR (US)

(72) Inventors: Anindya Sankar Dey, Bangalore (IN); Manish Kumar Barnwal, Burdwan (IN); Kushal Mogathal Kumar, Karnataka (IN); Nithya Swaminathan, Karnataka (IN); Onzali Suba, TamilNadu (IN)

(73) Assignee: Walmart Apollo, LLC, Bentonville, AR (US)

( * ) Notice: Subject to any disclaimer, the term of this patent is extended or adjusted under 35 U.S.C. 154(b) by 302 days.

(21) Appl. No.: 15/475,128

(22) Filed: Mar. 31, 2017

(65) Prior Publication Data
US 2018/0240072 A1  Aug. 23, 2018

(30) Foreign Application Priority Data
Feb. 17, 2017 (IN) .............................. 201741005645

(51) Int. Cl.
*G06Q 10/00* (2012.01)
*G06Q 10/10* (2012.01)
(Continued)

(52) U.S. Cl.
CPC ....... *G06Q 10/1053* (2013.01); *G06F 40/279* (2020.01); *G06N 20/00* (2019.01)

(58) Field of Classification Search
CPC ....... G06Q 10/1053; G06Q 10/063112; G06Q 50/01; G06Q 10/06398; G06Q 10/10;
(Continued)

(56) References Cited

U.S. PATENT DOCUMENTS 6,847,966 B1   1/2005   Sommer et al.
6,917,952 B1   7/2005   Dailey et al.
(Continued)

OTHER PUBLICATIONS

Divyanshu Chandola, Aditya Garg, Ankit Maurya, Amit Kushwaha. Online Resume Parsing System Using Text Analytics. Journal of Multi Disciplinary Engineering Technologies (JMDET) vol. 09 Issue: 01 Jul. 2015.*

(Continued)

*Primary Examiner* — Gabrielle A McCormick

(57) ABSTRACT

Examples of the disclosure provide a system and method for obtaining one or more current candidate resumes and one or more past candidate resumes associated with a role and analyzing full text of the obtained resumes to identify one or more items. Weighted values are determined for the identified items using a dimension reduction technique, and a probability score is calculated for each of the obtained current candidate resumes based on selection data associated with the obtained past candidate resumes. A keyword score is calculated for each of the obtained current candidate resumes based on a presence of one or more keywords associated with the role in the obtained current candidate resumes. A final candidate score is generated for each of the obtained current candidate resumes based on the keyword score and the calculated probability score, and the generated final candidate scores are output in association with the obtained current candidate resumes to a user interface.

20 Claims, 6 Drawing Sheets

(51) Int. Cl.
*G06F 40/279* (2020.01)
*G06N 20/00* (2019.01)

(58) Field of Classification Search
CPC .......... G06Q 10/06; G06Q 10/063118; G06Q 10/105; G06Q 10/1093; G06N 20/00; G06N 7/005; G06N 3/08
See application file for complete search history.

(56) References Cited

U.S. PATENT DOCUMENTS

| | | |
|---|---|---|
| 8,156,051 B1 | 4/2012 | Shah et al. |
| 8,650,177 B2 | 2/2014 | Skomoroch et al. |
| 8,818,910 B1 * | 8/2014 | Liu .................. G06Q 10/1053 705/321 |
| 2003/0177052 A1 | 9/2003 | Smith, III et al. |
| 2006/0245641 A1 | 11/2006 | Viola et al. |
| 2008/0222144 A1 | 9/2008 | Backer et al. |
| 2009/0006377 A1 * | 1/2009 | Kobayashi ............ G06F 16/355 |
| 2009/0089124 A1 | 4/2009 | Henderson et al. |
| 2009/0122892 A1 | 4/2009 | Cardie et al. |
| 2010/0070492 A1 | 3/2010 | Dattatri et al. |
| 2011/0078154 A1 | 3/2011 | Rickman et al. |
| 2013/0317998 A1 | 11/2013 | Chen et al. |
| 2014/0122355 A1 | 5/2014 | Hardtke et al. |

OTHER PUBLICATIONS

Chandola et al., "Online Resume Parsing System Using Text Analytics", Journal of Multi Disciplinary Engineering Technologies, vol. 09, Issue 01, Jul. 2015, 5 pages.

Sadiq et al., "Intelligent Hiring with Resume Parser and Ranking using Natural Language Processing and Machine Learning", International Journal of Innovative Research in Computer and Communication Engineering, vol. 4, Issue 4, Apr. 2016, 8 pages.

* cited by examiner

AUTOMATED RESUME SCREENING

BACKGROUND

Resume screening is a necessary task for any company or other employer interested in filling an employee position. It is a task that can cost many hours of work by human resources departments every time a company fills a position when the resumes are screened manually. Computer technology and the Internet has enabled candidates to send in resumes for positions with the click of a button, but a company may receive hundreds of resumes for a single open position. With manual resume screening, someone in HR at the company must read at least a portion of each resume in order to screen candidates. Further, the person screening the resumes may need to have some level of skill in the position or other knowledge about the position to make good judgments about the applicants, resulting in the valuable time of technical, or otherwise expert individuals being spent sifting through resumes.

Additionally, a person screening resumes manually may exhibit biases that affect their judgment when deciding on candidates. While the biases may be unintentional and/or subtle, the effect may be that good candidates go overlooked. Consistently hiring good candidates can be difficult when the resume screening process is spread among many people, each with their own set of biases, opinions, levels of knowledge etc. Providing an automated method of resume screening that is accurate and inclusive of all candidate factors is a challenge based on the complexity and varied information provided by the many candidate resumes received as well as the potentially wide variety of roles or positions at a given entity.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects of the disclosure provide a resume screening module that obtains current candidate resumes associated with a role, analyzes full text of the obtained current candidate resumes to identify one or more terms, which may be based on historical data associated with the role, obtains weighted values for the identified terms from the historical data associated with the role, calculates a probability score for each of the obtained current candidate resumes based on the historical data and the determined weighted values, calculates a keyword score for each of the obtained current candidate resumes based on the presence of keywords associated with the role in the current candidate resumes, generates a final candidate score for each of the obtained current candidate resumes based on the weighted values and the calculated probability score, and outputs the generated final candidate scores in association with the obtained current candidate resumes to a user interface.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

In FIGS. 1 to 6, the systems are illustrated as schematic drawings. The drawings may not be to scale. Corresponding reference characters indicate corresponding parts throughout the drawings.

DETAILED DESCRIPTION

The detailed description provided below in connection with the appended drawings is intended as a description of a number of embodiments and is not intended to represent the only forms in which the embodiments may be constructed, implemented, or utilized. Although the embodiments may be described and illustrated herein as being implemented in devices such as a server, personal computer, mobile device, or the like, this is only an exemplary implementation and not a limitation. As those skilled in the art will appreciate, the present embodiments are suitable for application in a variety of different types of computing devices, for example, PCs, servers, laptop computers, tablet computers, etc.

The terms 'computer', 'computing apparatus', 'mobile device' and the like are used herein to refer to any device with processing capability such that it can execute instructions. Those skilled in the art will realize that such processing capabilities are incorporated into many different devices and therefore the terms 'computer' and 'computing apparatus' each may include PCs, servers, laptop computers, mobile telephones (including smart phones), tablet computers, and many other devices.

Aspects of the disclosure described below are configured to automatically screen resumes based on resume text and historical data. The full text of submitted resumes is analyzed and compared against historical data, including weighted terms of past resumes associated with the same role, to determine a probability that the submitted resumes would be selected. The probability is combined with a keyword score based on the presence of keywords in the resumes to generate a final candidate score that is provided for use in candidate selection, substantially reducing the time and costs of hiring processes. Further, candidate selection results may be provided to the system, training the system to enhance the accuracy of generated final candidate scores over time.

Analysis of the full text of resumes enhances the accuracy of the of the screening process, potentially identifying well qualified candidates that may have been missed manual screening or simple keyword analysis. Resumes may be analyzed in large batches, providing significant efficiency advantages over manual screening. As the repository of past candidate resumes and associated selection results grows, the automated screening process is increasingly trained to provide desirable candidates, further reducing time and energy spent considering and/or interviewing candidates that are ultimately not selected.

Figure 1:
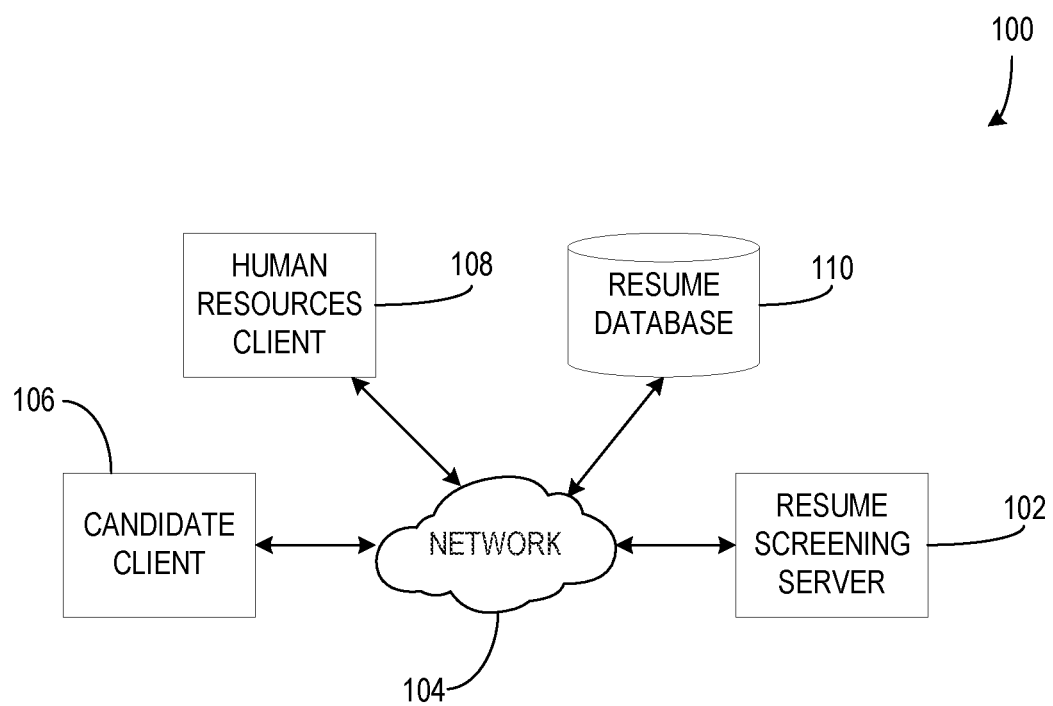
FIG. 1 illustrates a system for screening candidate resumes according to an embodiment.

FIG. 1 illustrates a system 100 for screening candidate resumes according to an embodiment. The system 100 includes a resume screening server 102 connected to a network 104. A candidate client 106 and human resources client 108 are also connected to the network 104. Finally, a resume database 110 is connected to the network 104. In an example, candidate resumes are provided via the candidate client 106 and/or human resources client 108. The candidate resumes are stored in the resume database 110 and screened by the resume screening server 102. The resume screening is described in detail below.

It should be understood that the network 104 may comprise the Internet, an intranet, a private network, a public network, or some combination thereof. The resume screening server 102, candidate client 106, and human resources client 108 may each include one or more computing devices (e.g., personal computers, servers, laptop computers, tablets, etc.) that include network interfaces with which to connect to the network 104. The resume database 110 may be housed within or as a part of a computing device, such as the resume screening server 102. Alternatively, the resume database 110 may be located apart from the resume screening server 102 and/or the other components of system 100. Further, the resume database 110 may be stored within a single memory device or it may be distributed across multiple memory devices and/or distributed across multiple geographic locations.

Figure 2:
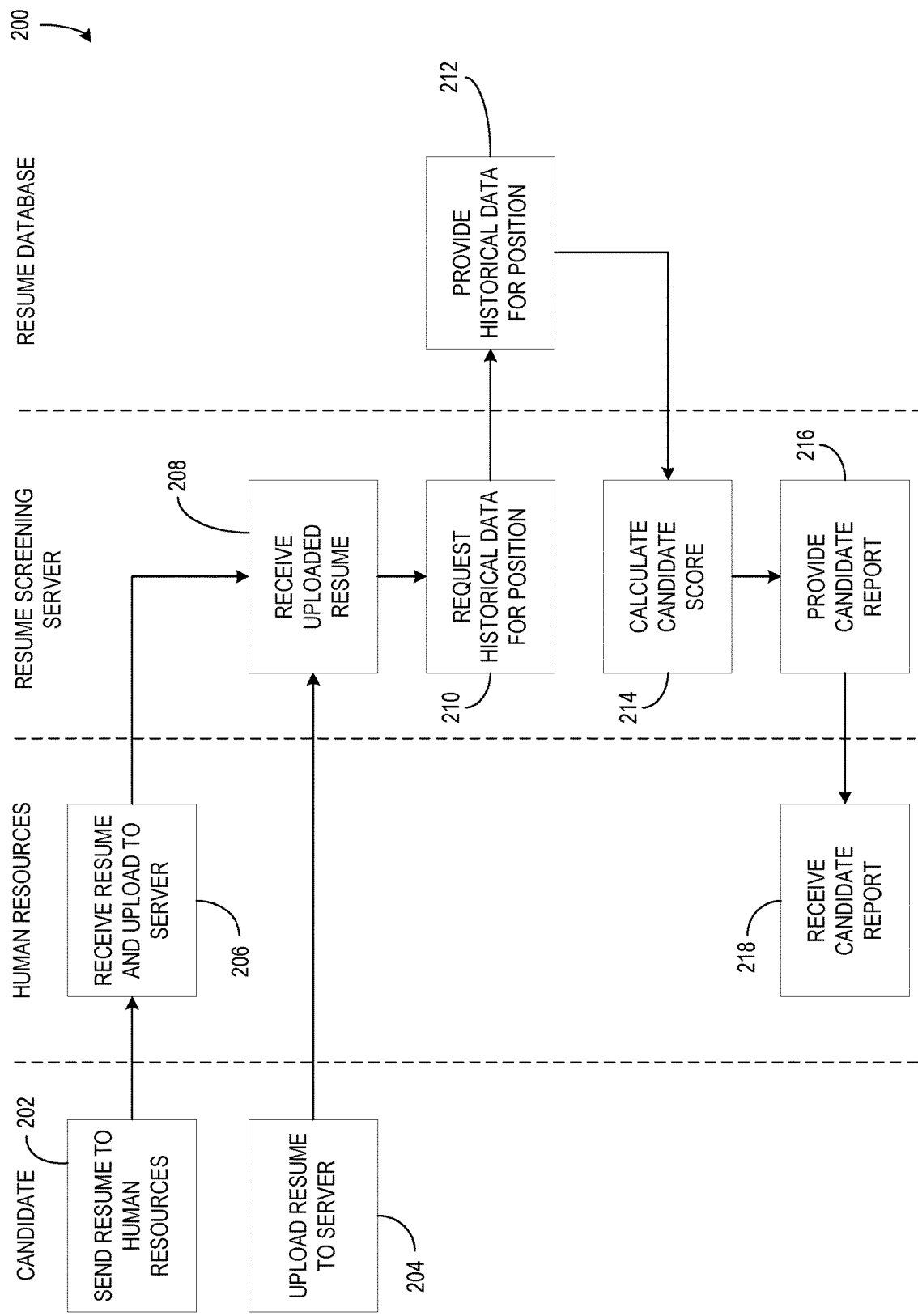
FIG. 2 illustrates a diagram of interactions between a candidate, human resources, a resume screening server, and a resume database according to an embodiment.

FIG. 2 illustrates a diagram 200 of interactions between a candidate client, human resources client, a resume screening server, and a resume database according to an embodiment. The candidate client (e.g., candidate client 106, etc.), at 202, may send a resume to human resources. Alternatively, at 204, the candidate client may upload the resume directly to the resume screening server (e.g., resume screening server 102, etc.). At 206, when the candidate client sends the resume to the human resources client, the human resources client (e.g., human resources client 108, etc.) receives the resume and uploads it to the resume screening server. In some examples, the human resources client may upload multiple resumes, and the multiple resumes may be associated with, or targeted at, one or more roles or positions. The human resources client may upload a role description to the resume screening server along with the resume(s). The role description may include information for use during screening, such as keywords or terms relevant to the role.

At 208, the resume screening server receives the uploaded resume. The server may identify elements of the resume, such as applicant name, position applied for, etc. as a part of a text analysis of the resume, as described below. At 210, the resume screening server requests historical data from the resume database for a position for which the candidate is applying. In response to the request, at 212, the resume database provides the historical data for the position. In some examples, the resume screening server requests historical data from the resume database for the position and for similar/related roles or positions. The resume database responds with combined historical data associated with the requested position and/or the similar/related roles or positions.

At 214, the resume screening server receives the requested historical data from the resume database and, based on the historical data, calculates a candidate score for the resume. Calculation of the candidate score based on the historical data is described in depth below. In some examples, the resume screening server receives multiple resumes, or a bulk resume upload, and calculates candidate scores for multiple received resumes. For instance, the resume screening server may receive 100 resumes associated with an open position and calculate a candidate score for each of the 100 resumes as described herein.

At 216, the resume screening server provides a candidate report based at least in part on the candidate score to the human resources client. The human resources client receives the provided candidate report at 218. The candidate report may include candidate scores for one or more candidates based on their provided resumes. Further, in some examples, the candidate report includes a probability score and/or a keyword score for each resume in addition to, or instead of, the candidate score. The candidates may be ranked based on candidate score and the candidate report may include a limited number of candidates with high ranks. For instance, the candidate report may include the top five candidates, top ten candidates, top twenty candidates, etc. Human resources may use the shortlist of top candidates in the candidate report to accelerate a hiring process for the associated position.

Alternatively, or additionally, the resume screening server may be configured to include candidates whose candidate scores exceed a defined candidate score threshold for the role or position. For instance, candidate scores may fall in a range between 0 and 100 and a candidate score threshold may be defined by human resources to be 70. The resume screening server may provide a candidate report that includes only candidates whose candidates scores exceed 70.

In an example, the resume screening server further obtains candidate selection data associated with the role. The candidate selection data includes which candidate(s) were selected for the role and/or which candidate(s) were not selected for the role. The resume screening server may generate a selection score (e.g., a Boolean value indicating whether a candidate associated with a resume was selected, etc.) for each of the resumes. Further, the resume screening server dynamically updates the historical data of the resume database using the recently screened resumes, final candidates scores of the recently screened resumes, and/or the candidate selection data.

Figure 3:
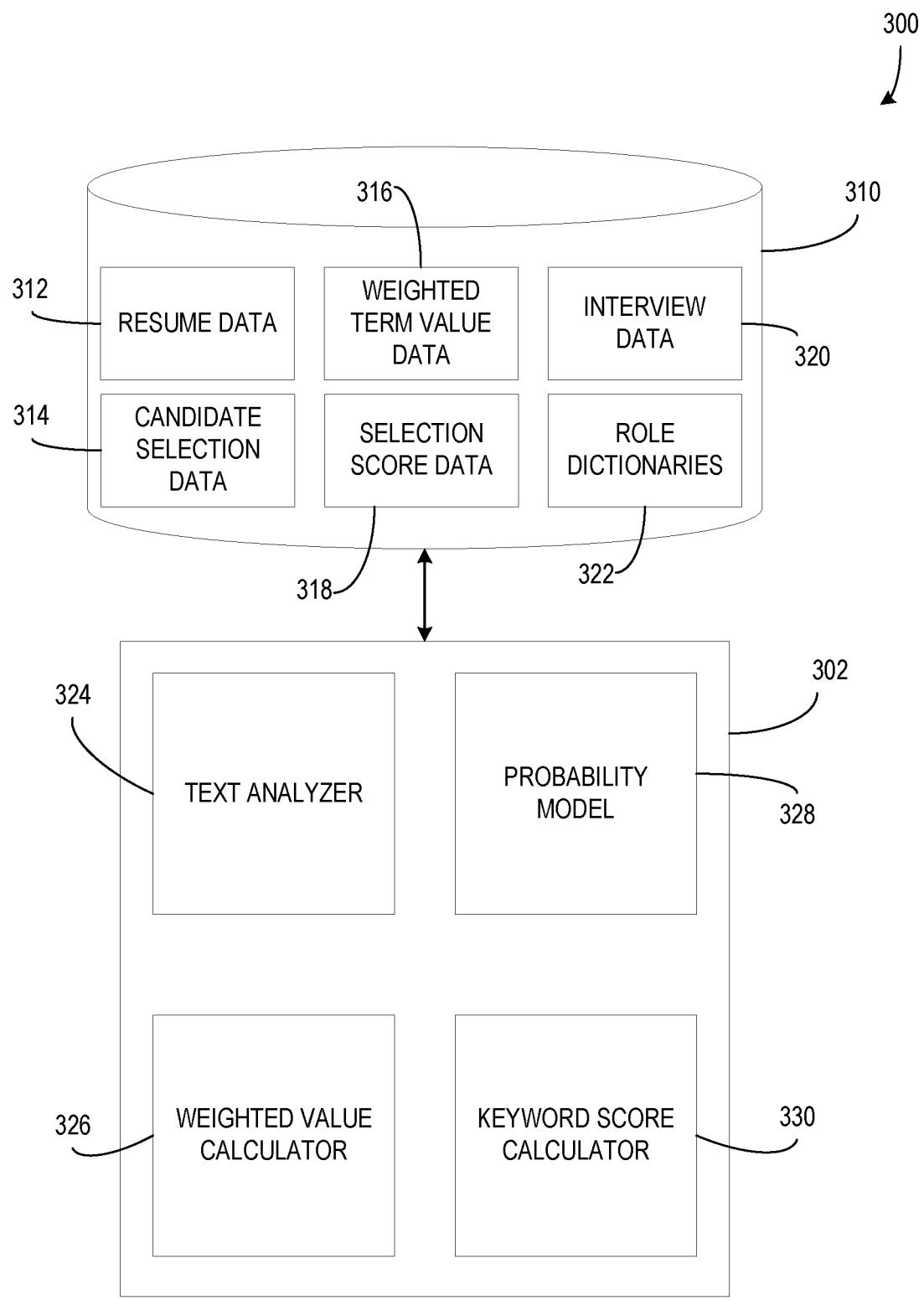
FIG. 3 illustrates a block diagram of a resume database and resume screening server, including components, according to an embodiment.

FIG. 3 illustrates a block diagram 300 of a resume database 310 and resume screening server, or module, 302, including components, according to an embodiment. The resume database 310 may include one or more of resume data 312, candidate selection data 314, weighted term value data 316, selection score data 318, interview data 320, and role dictionaries 322. The resume database 310 may include historical data pertaining to past resumes and/or data pertaining to currently submitted resumes. Resume data 312 may include full text of current and/or past resumes submitted to the system. Each resume may be associated with an identifier, applicant name, role or position, etc. for categorization. Further, the resumes of resume data 312 may each be associated with entries of the candidate selection data 314, selection score data 318, and interview data 320.

The candidate selection data 314 includes data entries for resumes for which selection decisions have been made. For instance, a candidate selection data 314 entry may include an indicator of whether a candidate associated with a resume was selected for an interview or not. Further, the entry may include whether the candidate was subsequently hired or not. The candidate selection data 314 of a resume may be reduced and/or transformed into a selection score value or values which are stored as selection score data 318. A selection score may include a Boolean value indicating whether a candidate associated with a resume was selected or not, a scale value indicating a candidate's progress through the interview process, a rating value indicating a candidate's selection quality, etc.

The weighted term value data 316 is calculated in real time, on the fly, as weighted value calculator 326 processes the extracted text from the resume data 312 as described below. The weighted term value data 316 may include terms and associated weighted values for each role or position that is analyzed by the resume screening server. A candidate resume associated with a role may be associated with the weighted term value data entries that are linked with the role. The weighted value of a term may indicate a strength of a relationship between the presence of the term in a resume and the probability that a candidate with the resume will be selected for the position. The terms may include a word, phrase, or other combination of words. In some examples, the weighted term value data 316 is calculated on the fly, as needed by the process described herein. Alternatively, or additionally, the weighted term value data 316 may be stored in the resume database 310.

The interview data 320 includes data entries for resumes of candidates with whom interviews have been conducted. For example, an interview data 320 entry may include an indicator or score value corresponding to a selection of a candidate for an interview, a performance of the candidate in the interview, or a selection of a candidate based on the interview. In some examples, the interview data 320 may be used by the resume screening server 302 to calculate a probability that a current candidate will be selected for an interview, or will perform well in an interview, based on the candidate's resume. In one illustrative example, the interview data 320 includes binary values that are representative of candidates' performances at stages of the hiring process related to interviewing. For instance, the interview data 320 may include a binary value that indicates whether a candidate was selected to be interviewed and/or a binary value that indicates whether a candidate was hired after being interviewed.

The role dictionaries 322 include keywords that are associated with roles. Each role may be associated with a role dictionary, and the role dictionary is populated with words and/or terms that are considered keywords for the associated role. Role dictionaries may be created by managers or human resources when defining roles and amended by managers or human resources to refine the list of keywords over time.

The resume screening server 302 includes components such as a text analyzer 324, a weighted value calculator 326, a probability model 328, and a keyword score calculator 330. In some examples, a resume database 310 and/or a resume screening server 302 may include more, fewer, or different components than described herein.

The text analyzer 324 is configured to analyze the full text of candidate resumes obtained from the resume database 310 or from another source (e.g., a candidate client 106, a human resources client 108, etc.). The analysis of the full text may identify terms based on historical data associated with the role for which the resumes are submitted. For instance, the identified terms may be terms that are present in data of the resume database 310 (e.g., in the resume data 312, in the weighted term value data 316, etc.) associated with the role. The terms may also be keywords that have been identified as being relevant to the associated role.

In some examples, all, or nearly all the words of the full text of current and past candidate resumes are included in the text analysis. The text analysis includes removing all punctuation, stop words, such as articles, conjunction, etc. from the full text of the resumes to isolate the remaining words. Then, the text analyzer 324 stems the words of the resume so that words of varying tenses and forms are transformed to base words to reduce the total number of words to analyze. For instance, "model", "models", and "modeling" may be transformed to "model".

Weighted term values, or weighted values, are generated by the weighted value calculator 326 in real time based on the analyzed words of the text analyzer 324. Further, the weighted values may be determined based on job description data corresponding to the associated role. The weighted value calculator 326 is configured to convert the sets of words from current and past resumes into a document term matrix, like the example matrix shown in Table 1.

TABLE 1

| Resume ID | Term 1 | Term 2 | Term 3 | Term 4 | Term 5 |
|---|---|---|---|---|---|
| Res 1 | 1 | 0 | 0 | 5 | 0 |
| Res 2 | 5 | 0 | 1 | 0 | 0 |
| Res 3 | 0 | 3 | 0 | 0 | 3 |
| Res 4 | 0 | 3 | 5 | 0 | 5 |
| Res 5 | 0 | 0 | 4 | 3 | 2 |

In Table 1, each row represents a resume and may be either a current resume submitted for screening or a past resume from historical data. Each column represents a term that is found in one or more of the resumes represented in the table. Each cell of the matrix contains a number corresponding to how many times the term of the column appears in the resume of the row. An exemplary matrix may have ~100 rows and ~6000 columns for a set of resumes. Because each unique word or term is assigned to a column, the number of columns may be very large.

Continuing the example, the weighted value calculator 326 is configured to apply a dimension reduction technique, such as a truncated singular value decomposition (SVD) function for example, to the document term matrix to combine terms and reduce the number of columns. For instance, the ~6000 columns may be reduced to ~90 columns using such a function as understood by a person of ordinary skill in the art of mathematics, linear algebra, or the like. Each column in the newly-generated reduced matrix is associated with a term or combination of terms from the original matrix, such that each of the original terms is represented by at least one column. The value in each cell represents the presence of the combined term, or portions of the combined term, of the column in the resume of the row. See Table 2 for an example.

TABLE 2

| Resume ID | Combined Term 1 | Combined Term 2 | Combined Term 3 |
|---|---|---|---|
| Res 1 | 0.532 | 0.898 | 0.212 |
| Res 2 | 0.323 | 0.434 | 0.567 |
| Res 3 | 0.675 | 0.909 | 0.121 |
| Res 4 | 0.143 | 0.231 | 0.432 |
| Res 5 | 0.465 | 0.002 | 0.345 |

The past resumes in the reduced matrix for which candidate selection data 314 is available are used as a dataset to calculate weighted values for determining a probability that a current resume is selected. The weighted value calculator 326 analyzes the reduced matrix values of past resumes that were selected and/or past resumes that were rejected and builds rules, or candidate features, for classifying current resumes based on the weighted values. The weighted values, rules, and/or candidate features may optionally be stored as weighted term value data 316 in the resume database 310. In some examples, other data, such as selection score data 318 and/or interview data 320 may be used in conjunction with the values of the reduced matrix to determine a probability of a candidate's performance in the selection process and/or an interview, as described with the candidate selection data 314.

Once generated, the weighted term value data 316, including weighted values, rules, and/or candidate features, may be used to create, adjust, and/or train the probability model 328. Further, results of recent resume screenings by the resume screening server 302 in combination with associated candidate selection data (e.g., reported decisions regarding the recently screened resumes from human resources, etc.) may be included during the weighted value calculation described above such that the probability model 328 is "trained" based on feedback from recent results. In some examples, the probability model 328 is a predictive model, and the components of the resume screening server 302 function as a machine learning engine to train the probability model 328 over time to improve accuracy of probability generation.

Recently submitted resumes in the reduced matrix are associated with the cell values in their representative rows, and those cell values are compared to the weighted values, rules, and/or candidate features associated with the past resume selection results by application of the probability model 328. For instance, the rules of the probability model 328 may cause resumes with cell values that are similar to cell values of past resumes that were accepted and/or different from cell values of past resumes that were rejected to be classified as a high probability of acceptance. Further, the rules of the probability model 328 may cause resumes with cell values that are similar to cell values of past resumes that were rejected and/or different from cell values of past resumes that were accepted to be classified as a low probability of acceptance. The resume screening server 302 applies the probability model 328 to current resumes to determine a probability score, or estimation that the candidate associated with a resume will be selected.

In an example, the weighted values are calculated and the probability model 328 is trained immediately prior to applying the probability model 328 to current resumes to determine probability scores. Alternatively, previously calculated weighted term value data 316 may be accessed from the resume database 310 and/or a previously trained probability model 328 may be applied to current resumes to determine a probability score.

The keyword score calculator 330 is configured to calculate a keyword score of each current resume. In an example, the keyword score is based on a comparison of key words or terms (e.g., terms with comparatively high values in the weighted term value data 316, terms defined as relevant to the role/position, etc.) in the historical resumes of resume data 312 to the presence of the key terms in the current resume. For each role, the resume screening server 302 may create or access a role dictionary 322 containing keywords or terms relevant to the role. The proportion of keywords from the role dictionary that are present in the resume is the keyword score of the resume.

The resume screening server 302 uses the probability score in conjunction with the keyword score to calculate a final candidate score that is provided to human resources for use in resume selection. The resume screening server 302 may multiply, or otherwise combine, the probability and keyword score values to obtain the final candidate score for the resume.

Figure 4:
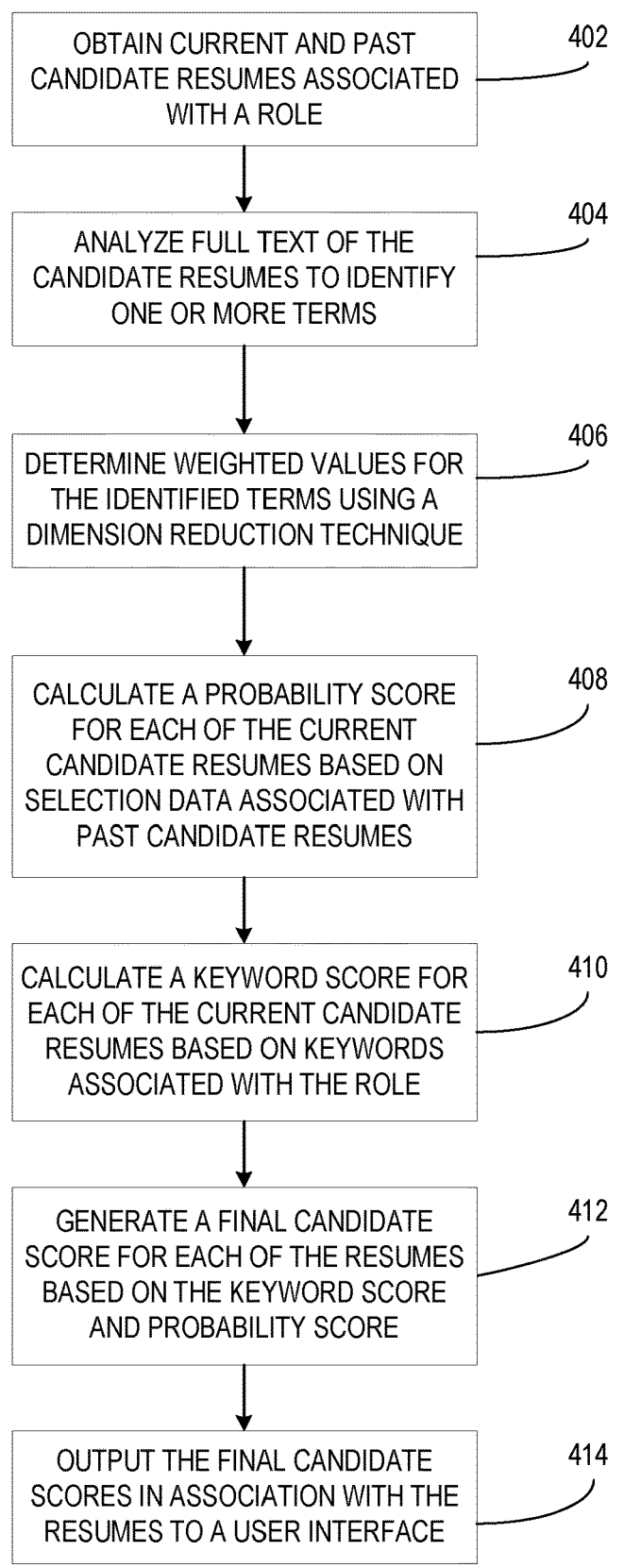
FIG. 4 illustrates a flow chart of a method of generating and outputting final candidate scores based on candidate resumes and historical data according to an embodiment.

FIG. 4 illustrates a flow chart of a method 400 of generating and outputting final candidate scores based on candidate resumes and historical data according to an embodiment. The process begins by obtaining current and past candidate resumes associated with a role at operation 402. The current candidate resumes may be obtained from human resources or directly from the candidates, as described above. Past resume data is obtained from a resume database (e.g., resume database 310, etc.).

At operation 404, the full text of the candidate resumes is analyzed to identify one or more terms. The terms are based, at least in part, on historical data associated with the role, as described above. The historical data may include, for instance, past candidate resumes, past candidate selection data, past selection scores corresponding to past candidate resumes, and/or interview data associated with past candidate resumes. In some examples, the full text may be analyzed to stem words identified in the full text and batch the identified words into terms, for which weighted values may be obtained or created by using a dimension reduction technique.

Weighted values are determined for the identified terms of the candidate resumes using a dimension reduction technique at operation 406. At operation 408, a probability score is calculated for each of the current candidate resumes based on selection data associated with past candidate resumes. Selection data may further include selection score data and/or interview data.

At operation 410, a keyword score is calculated for each of the current candidate resumes based on the presence of keywords associated with the role in the current candidate resumes. As described above, the keyword score may be a value representing the proportion or percentage of keywords associated with the role present in the current candidate resume.

At operation 412, a final candidate score is generated for each of the resumes based on the keyword score and probability score. In some examples, probability scores, keyword scores, and/or final candidate scores of current candidate resumes are calculated and/or generated using a predictive model, as described above. Further, the predictive model may be dynamically updated by a machine learning mechanism upon obtaining candidate selection data as feedback from human resources.

At operation 414, the final candidate scores for each of the resumes are output to a user interface. The final candidates scores may be output to a user interface in the form of a report, as described above. The user interface may include a screen, printout, or the like.

In some examples, the method includes obtaining candidate selection data associated with the role, such as which candidate(s) were selected for the role and which candidate(s) were not selected for the role. A selection score may be generated for each of the resumes. Further, the historical data of the resume database is dynamically updated using the current candidate resumes, final candidates scores of the current candidate resumes, and/or the candidate selection data.

Figure 5:
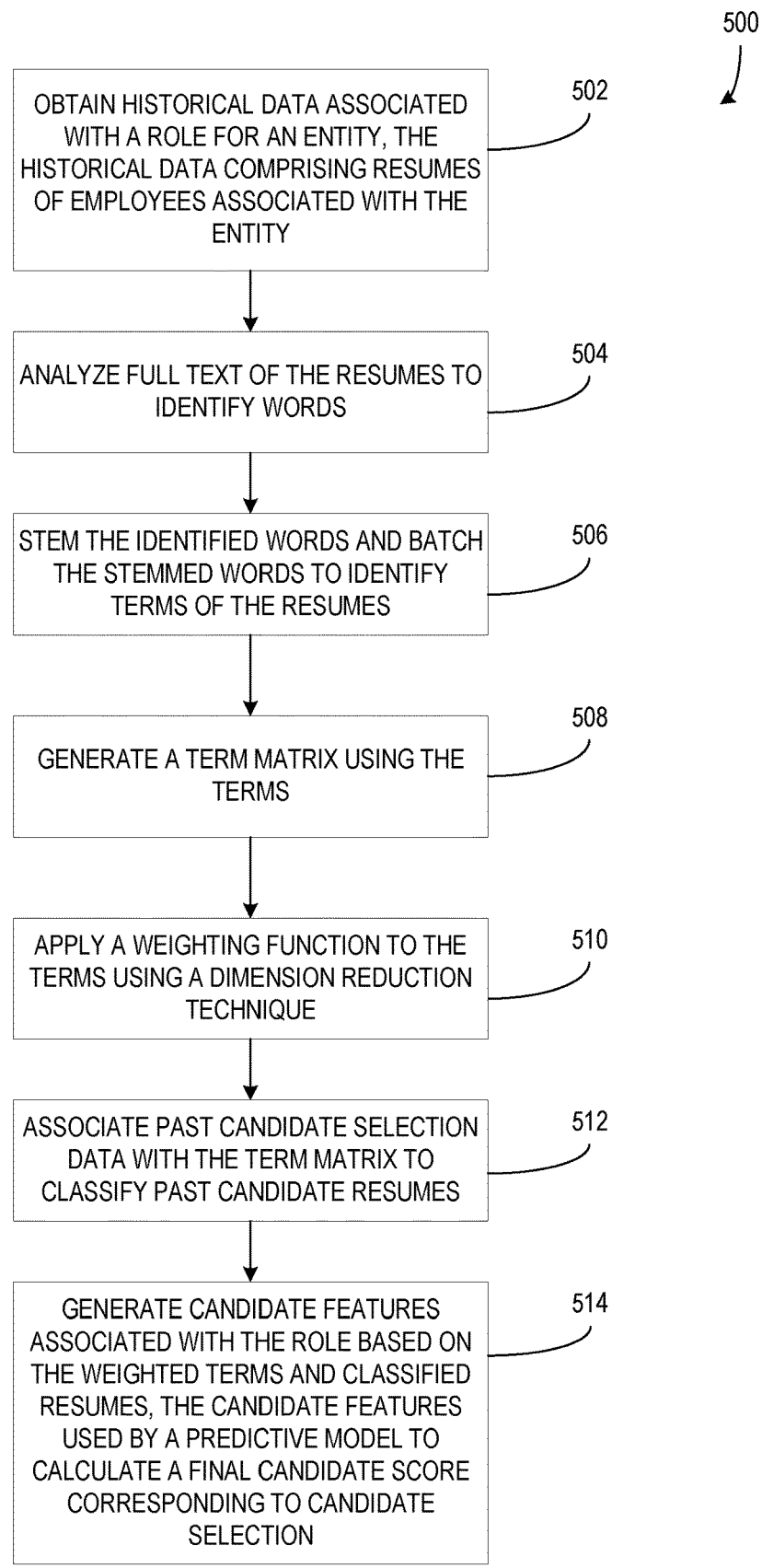
FIG. 5 illustrates a flow chart of a method of generating candidate features associated with a role based on historical data according to an embodiment.

FIG. 5 illustrates a flow chart of a method 500 of generating candidate features associated with a role based on historical data according to an embodiment. At operation 502, historical data associated with a role for an entity is obtained, the historical data comprising resumes of employees associated with the entity. In an example, the historical data also includes past resumes of candidates that were not selected for employment and/or past resumes of candidates that were selected but are not employed with the entity currently.

At operation 504, the full text of the resumes is analyzed to identify words. The words may be identified by identifying and removing punctuation, stop words, conjunctions, and non-alphanumeric data from the full text.

At operation 506, the words are stemmed and batched to identify terms of the resumes. Stemming the words may include converting or transforming words in various tenses or forms into a single base form of the word. For instance, "modeling" and "models" may both be stemmed to "model". By converting the words to base forms, common words across resumes and historical data, terms, etc. may be identified regardless of form or tense. Further, the number of words to identify and/or batch is reduced by stemming.

At operation 508, a term matrix is generated using the identified terms. The matrix identifies values associated with individual terms of the identified terms relative to individual resumes of past candidate resumes.

A weighting function is applied to the terms using a dimension reduction technique, such as a truncated singular value decomposition algorithm for example, at operation 510. In some examples, the weighting function is applied to the term matrix to create a dataset for use with the resumes.

Past candidate selection data is associated with the term matrix to classify the past candidate resumes at operation 512. For instance, the past candidate selection data may include selection scores for each of the past candidate resumes. The past candidate resumes may be classified as either "selected" or "not selected" based on the selection scores or other selection data.

At operation 514, candidate features associated with the role and based on the weighted terms are generated. The candidate features are used by a predictive model to calculate a final candidate score corresponding to candidate selection. Candidate features may include words, terms, or combinations thereof that must be present or that indicate a high likelihood that the candidate will be chosen for the position. Additionally, candidate features may include words, terms, or combinations thereof that indicate a low likelihood that the candidate will be chosen for the position. The candidate features may be used as rules in the predictive model for calculating a probability score and/or a final candidate score for candidate resumes.

Alternatively, or in addition to the other examples described herein, examples include any combination of the following:
  obtains candidate selection data associated with the role;
  generates a selection score for each of the one or more obtained current candidate resumes based on obtained candidate selection data;
  dynamically updates the historical data using the obtained one or more current candidate resumes, the generated final candidate score for each of the one or more obtained current candidate resumes, and the obtained candidate selection data;
  wherein the historical data comprises at least one of a plurality of past candidate resumes, or a plurality of past candidate selection data;
  wherein the resume screening module further determines the one or more weighted values for the one or more terms identified in the full text of the one or more obtained current candidate resumes using job description data corresponding to the associated role;
  wherein resume screening module uses a dimension reduction technique to reduce one or more dimensions of a term matrix, the term matrix comprising the one or more identified terms of the one or more obtained current candidate resumes and one or more identified terms of a plurality of past candidate resumes;
  wherein the resume screening module is trained using past candidate resumes;
  wherein the resume screening module comprises a predictive model and a machine learning engine;
  wherein the machine learning engine updates the predictive model upon obtaining candidate selection data;
  wherein the probability score is directed towards an estimation of candidate selection;
  obtaining the selection data associated with the one or more past candidate resumes;
  generating a selection score for each of the one or more obtained current candidate resumes based on the obtained selection data;
  dynamically updating the obtained selection data upon receiving new selection data associated with the one or more obtained current candidate resumes;
  wherein the historical data comprises at least one of a plurality of past candidate resumes or a plurality of past candidate selection data;
  wherein analyzing the full text of the one or more obtained current candidate resumes to identify the one or more terms includes identifying a plurality of words from the full text, stemming one or more of the plurality of identified words, and batching the one or more stemmed words to identify the one or more terms for a term matrix, the weighting applied to the term matrix;
  calculating the probability score and generating the final candidate score for each of the one or more obtained current candidate resumes is performed using a predictive model of the resume screening module;
  wherein the predictive model is dynamically updated by a machine learning mechanism of the resume screening module upon obtaining candidate selection data;
  wherein applying the weighting function to the one or more identified terms reduces the dimension of the term matrix, forming one or more weighted terms;
  identifying punctuation, stop words, conjunctions, and non-alphanumeric data from the one or more resumes to identify the plurality of words;
  removing the identified punctuation, stop words, conjunctions, and non-alphanumeric data from the one or more resumes prior to stemming the identified plurality of words;
  obtaining a batch of current candidate resumes;
  analyzing the batch of current candidate resumes and the obtained historical data to calculate current final candidate scores for the batch of current candidate resumes;
  creating a role dictionary for the role;
  calculating a proportion value for the one or more resumes based on an analysis of the full text against the role dictionary.

In some examples, the operations illustrated in FIG. 4 and FIG. 5 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

Exemplary Operating Environment

Figure 6:
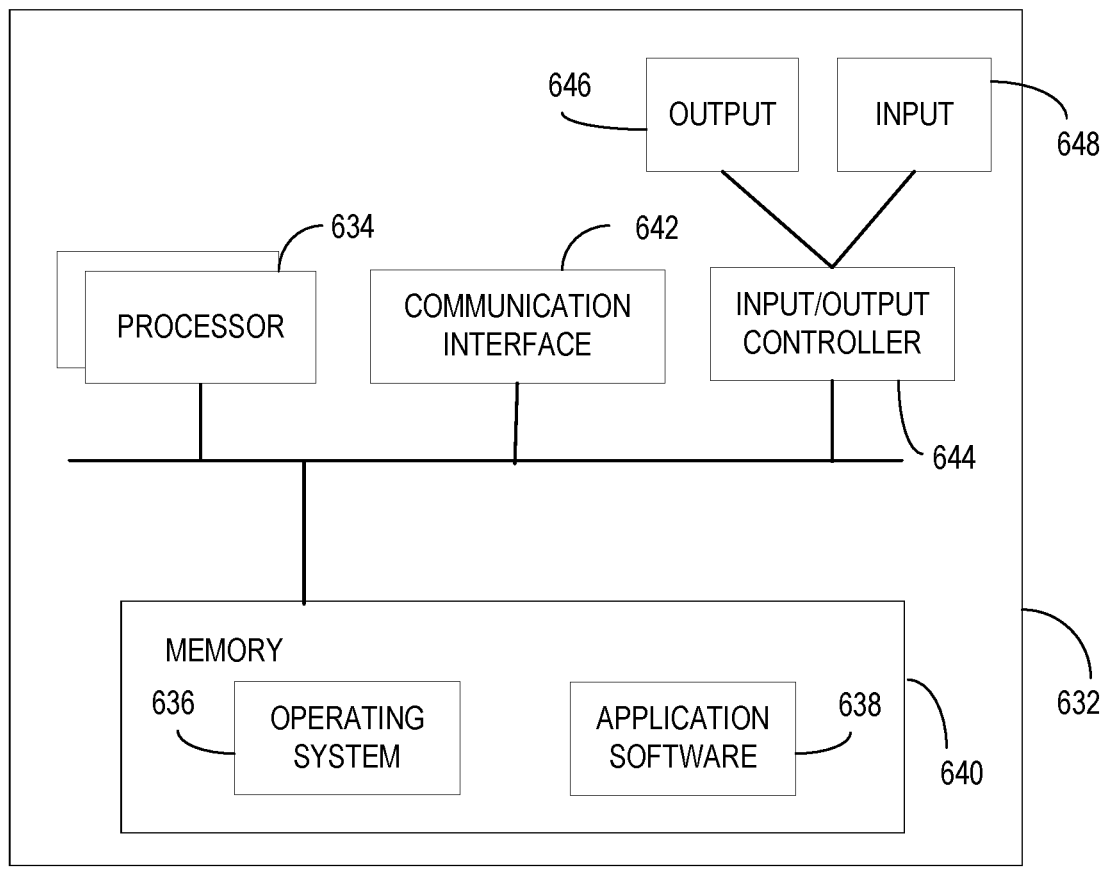
FIG. 6 illustrates a computing apparatus according to an embodiment as a functional block diagram.

FIG. 6 illustrates a computing apparatus 632 according to an embodiment as a functional block diagram. In an embodiment, components of a computing apparatus 632 may be implemented as a part of an electronic device and/or computing device according to one or more embodiments described in this specification. The computing apparatus 632 comprises one or more processors 634 which may be microprocessors, controllers or any other suitable type of processors for processing computer executable instructions to control the operation of the electronic device. Platform software comprising an operating system 636 or any other suitable platform software may be provided on the apparatus 632 to enable application software 638 to be executed on the device. According to an embodiment, receiving resumes, analyzing resume text, and generating candidate scores based on the resume text and historical data may be accomplished by software. Furthermore, it may receive network communications from other computing devices via a network or other type of communication link resume data, candidate selection data, or the like.

Computer executable instructions may be provided using any computer-readable media that are accessible by the computing apparatus 632. Computer-readable media may include, for example, computer storage media such as a memory 640 and communications media. Computer storage media, such as a memory 640, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 640) is shown within the computing apparatus 632, it will be appreciated by a person skilled in the art, that the storage may be distributed or located remotely and accessed via a network or other communication link (e.g. using a communication interface 642).

The computing apparatus 632 may comprise an input/output controller 644 configured to output information to one or more output devices 646, for example a display or a speaker, which may be separate from or integral to the electronic device. The input/output controller 644 may also be configured to receive and process an input from one or more input devices 648, for example, a keyboard, a microphone or a touchpad. In one embodiment, the output device 646 may also act as the input device. An example of such a device may be a touch sensitive display. The input/output controller 644 may also output data to devices other than the output device, e.g. a locally connected printing device.

The functionality described herein can be performed, at least in part, by one or more hardware logic components. According to an embodiment, the computing apparatus 632 is configured by the program code when executed by the processor 634 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although some of the present embodiments may be described and illustrated as being implemented in a client device, server device, personal computer, or the like, these are only examples of a device and not a limitation. As those skilled in the art will appreciate, the present embodiments are suitable for application in a variety of different types of devices, such as conventional computing devices, portable and mobile devices, laptop computers, tablet computers, etc.

Any range or device value given herein may be extended or altered without losing the effect sought, as will be apparent to the skilled person.

The embodiments illustrated and described herein as well as embodiments not specifically described herein but within the scope of aspects of the claims constitute exemplary means for processing resumes and generating final candidate scores based on resume text and historical data. The illustrated one or more processors 634 together with the computer program code stored in memory 640 constitute exemplary processing means for receiving resumes, analyzing text of resumes, calculating weighted values, applying a probability model to resume data, and generating final candidate scores.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

The term "comprising" is used in this specification to mean including the feature(s) or act(s) followed thereafter, without excluding the presence of one or more additional features or acts. Furthermore, when introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

The invention claimed is:

1. A system for automated resume screening, the system comprising:
    at least one memory;
    at least one processor coupled to the memory;
    a text analyzer, implemented on the at least one processor, that at least:
        obtains historical resumes,
        isolates historical terms via a full text analysis of the historical resumes;
    a weighted value calculator, implemented on the at least one processor, that at least:
        obtains historical candidate selection data associated with the historical resumes,
        based at least on some of the historical candidate selection data, determines weighted historical term values of at least some of the isolated historical terms;
    a machine learning engine, implemented on the at least one processor, that at least machine trains a predictive model based at least on some of the weighted historical term values;
    a keyword score calculator, implemented on the at least one processor, that at least:
        analyzes one or more current candidate resumes associated with a role, and
        based at least on some of the weighted historical term values, determines a keyword score of the one or more current candidate resumes,
    wherein the text analyzer further at least extracts current terms via a full text analysis of the one or more current candidate resumes,
    wherein the weighted value calculator further at least determines weighted current term values of at least some of the extracted current terms based at least on some of the historical candidate selection data,
    wherein the predictive model determines a probability score of each of the one or more current candidate resumes; and
    a resume screening module, implemented on the at least one processor, at least:
        generates a candidate score of each of the one or more current candidate resumes based at least on the weighted current term values and the probability score of each of the one or more current candidate resumes,
        generates a candidate report based at least one the candidate score, and
        provides the candidate report on a user interface, and
        receives new candidate selection data feedback indicating selection decisions of the one or more current candidate resumes,
    wherein the weighted value calculator updates the weighted historical term values based at least on some of the new candidate selection data feedback, and
    wherein the machine learning engine updates the predictive model based at least on some of the new candidate selection data feedback.

2. The system of claim 1, wherein the weighted current values of the extracted current terms is further based at least on job description data corresponding to the role.

3. The system of claim 1, wherein the weighted value calculator applies a dimension reduction technique to reduce a dimension of a term matrix, the term matrix comprising at least some of the isolated historical terms.

4. The system of claim 1, wherein the text analyzer further at least stems at least some of the isolated historical terms.

5. The system of claim 1, wherein the text analyzer updates the isolated historical terms based at least on some of the one or more current candidate resumes.

6. The system of claim 1, wherein the machine learning engine updates the predictive model based at least on some of the one or more current candidate resumes.

7. The system of claim 1, wherein the keyword score calculator determines one or more weighted current term values of the extracted current terms based further at least on keywords of a role dictionary.

8. The system of claim 7, wherein the role dictionary is updated based at least on the one or more current candidate resumes.

9. The system of claim 1, wherein the historical resumes are updated based at least on the one or more current candidate resumes.

10. The system of claim 1, wherein the historical candidate selection data is updated based at least on the new candidate selection data feedback.

11. A method for automated resume screening comprising:
    obtaining, by a resume screening module implemented on at least one processor having a machine learning mechanism, one or more past candidate resumes associated with a role;
    isolating historical terms via a full text analysis of the one or more past candidate resumes;
    obtaining historical candidate selection data associated with the one or more past candidate resumes;
    based at least on some of the historical candidate selection data, determining weighted historical term values of at least some of the isolated historical terms;
    machine training a predictive model based at least on some of the weighted historical term values;
    obtaining one or more current candidate resumes associated with a role;
    extracting current terms via a full text analysis of the one or more current candidate resumes;
    based at least on some of the weighted historical term values, determining one or more weighted current term values of the extracted current terms;
    calculating a probability score for each of the one or more current candidate resumes based at least on the predictive model;
    generating a candidate score for each of the one or more current candidate resumes based at least on one or more weighted current term values and the probability score;
    outputting the generated candidate scores in association with the one or more current candidate resumes to a user interface;
    receiving new candidate selection data feedback indicating selection decisions of the one or more current candidate resumes;

updating the weighted historical term values based at least on some of the new candidate selection data feedback; and updating, by the machine learning, the predictive model based at least on some of the new candidate selection data feedback.

12. The method of claim 11, wherein the isolating the isolated historical terms includes:

identifying a plurality of words from the one or more past candidate resumes;

stemming one or more of the plurality of identified words; and batching the one or more stemmed words to identify the isolated historical terms for a term matrix.

13. The method of claim 11 further comprising:

updating the isolated historical terms based at least on some of the one or more current candidate resumes.

14. The method of claim 11 further comprising:

updating, by the machine learning, the predictive model based at least on some of the one or more current candidate resumes.

15. The method of claim 11 further comprising:

generating a first report indicating at least the probability score for each of the one or more current candidate resumes; and displaying the first report on the user interface, wherein the outputting the generated candidate scores includes at least displaying a second report indicating at least the generated candidate scores in association with the one or more current candidate resumes on the user interface.

16. One or more computer storage devices having computer-executable instructions stored thereon for machine training an automated resume screening device, which, on execution by a computer, cause the computer to perform operations comprising:

obtaining historical data associated with a role for an entity, the historical data comprising one or more past candidate resumes and past candidate selection data;

analyzing full text of the one or more past candidate resumes to identify a plurality of words;

stemming one or more of the identified plurality of words and batch the stemmed words to identify one or more terms of the one or more past candidate resumes;

generating a term matrix using the one or more identified terms, the term matrix identifying a value associated with individual terms of the one or more identified terms relative to individual resumes of the one or more past candidate resumes;

applying a weighting function to the one or more identified terms of the term matrix using dimension reduction to form one or more weighted terms;

associating past candidate selection data with the term matrix to classify the individual resumes of the one or more past candidate resumes; and generating candidate features associated with the role based on the one or more weighted terms and the classified individual resumes;

machine training a predictive model based at least on some of the generated candidate features;

obtaining one or more current candidate resumes associated with a role;

calculating a probability score for each of the one or more current candidate resumes based at least on the predictive model;

outputting the probability score in association with the one or more current candidate resumes to a user interface;

receiving new candidate selection data feedback indicating selection decisions of the one or more current candidate resumes; and updating the machine training at least by updating the generated candidate features and the predictive model based at least on some of the new candidate selection data feedback.

17. The one or more computer storage devices of claim 16, wherein the applying the weighting function to the one or more identified terms reduces one or more dimensions of the term matrix using a truncated single value decomposition function.

18. The one or more computer storage devices of claim 16, wherein the analyzing the full text to identify the plurality of words further cause the computer to perform operations comprising:

identifying punctuation, stop words, conjunctions, and non-alphanumeric data from the one or more past candidate resumes to identify the plurality of words; and removing the identified punctuation, stop words, conjunctions, and non-alphanumeric data from the one or more past candidate resumes prior to stemming the identified plurality of words.

19. The one or more computer storage devices of claim 16, wherein the analyzing the full text to identify the plurality of words further cause the computer to perform operations comprising:

creating a role dictionary for the role; and calculating a proportion value for the one or more past candidate resumes based on an analysis of the full text against the role dictionary.

20. The one or more computer storage devices of claim 16, wherein the predictive model is dynamically updated based at least on some of the one or more current candidate resumes.

* * * * *